United States Patent
Hendrickx et al.

(10) Patent No.: US 10,160,680 B2
(45) Date of Patent: Dec. 25, 2018

(54) PROCESS FOR BIOLOGICAL REMOVAL OF NITROGEN FROM WASTEWATER

(71) Applicant: Paques I.P. B.V., Balk (NL)

(72) Inventors: Tim Lucas George Hendrickx, Amersfoort (NL); Tommaso Lotti, Florence (IT); Marinus Cornelis Maria Van Loosdrecht, The Hague (NL); Jans Kruit, Beuningen (NL)

(73) Assignee: PAQUES I.P. B.V., Balk (NL)

( * ) Notice: Subject to any disclaimer, the term of this patent is extended or adjusted under 35 U.S.C. 154(b) by 559 days.

(21) Appl. No.: 14/784,830

(22) PCT Filed: Apr. 3, 2014

(86) PCT No.: PCT/NL2014/050204
§ 371 (c)(1),
(2) Date: Oct. 15, 2015

(87) PCT Pub. No.: WO2014/171819
PCT Pub. Date: Oct. 23, 2014

(65) Prior Publication Data
US 2016/0052811 A1    Feb. 25, 2016

(30) Foreign Application Priority Data

Apr. 16, 2013 (EP) ..................... 13163989

(51) Int. Cl.
*C02F 3/30* (2006.01)

(52) U.S. Cl.
CPC .......... *C02F 3/307* (2013.01); *C02F 2209/02* (2013.01); *C02F 2209/08* (2013.01); *C02F 2209/34* (2013.01); *C02F 2209/44* (2013.01); *Y02E 50/343* (2013.01)

(58) Field of Classification Search
CPC .. C02F 3/307; C02F 2101/16; C02F 2209/02; C02F 2209/08; C02F 2209/34; C02F 2209/44; C02F 2301/046; Y02E 50/343
See application file for complete search history.

(56) References Cited

U.S. PATENT DOCUMENTS

| | | |
|---|---|---|
| 2011/0180476 A1 | 7/2011 | Vanotti et al. |
| 2013/0001160 A1* | 1/2013 | Nyhuis ................ C02F 3/301 210/609 |

FOREIGN PATENT DOCUMENTS

| | | |
|---|---|---|
| EP | 1 806 325 A1 | 7/2007 |
| JP | 2003-033785 A | 4/2003 |
| JP | 2006-055739 A | 3/2006 |
| WO | WO 2011/110905 A1 | 9/2011 |

OTHER PUBLICATIONS

Arrojo et al., "Influence of gas flow-induced shear stress on the operation of the Anammox process in a SBR", Chemosphere, Aug. 2008, vol. 72, No. 11, pp. 1687-1693.
Tang et al., "The shear force amendments on the slugging behavior of uplow Anammox granular sludge bed reactor", Separation and Purification Technology, 2009, vol. 69, No. 3, pp. 262-268.
Vazquez-Padin et al., "Applicatoins of Anammox based processes to treat anaerobic digester supernatant at room temperature", Bioresource Technology, Jun. 2009, vol. 100, No. 12, pp. 2988-2994.
Vazquez-Padin et al., "Autotrophic nitrogen removal at low temperature", Water Science & Technology, 2011, vol. 63, No. 6, pp. 1282-1288.
Vazquez-Padin et al., "Treatment of anaerobic sludge digester effluents by the CANON process in an air pulsing SBR" Journal of Hazardous Materials, 2009, vol. 166, No. 1, pp. 336-341.
Winkler et al., "Integration of anammox into the aerobic granular sludge process for main stream wastewater treatment at ambient temperatures", Water Research, 2012, vol. 46, pp. 136-144.
Zhang et al., "Anammox transited from denitrification in upflow biofilm reactor", Journal of Environmental Sciences, 2004, vol. 16, No. 6, pp. 1041-1045.

* cited by examiner

*Primary Examiner* — Patrick J Orme
(74) *Attorney, Agent, or Firm* — Gilberto M. Villacorta; Sunlit Talapatra; Foley & Lardner LLP

(57) ABSTRACT

A process is provided, comprising: (a) supplying ammonium-containing wastewater to a reactor containing granular sludge comprising granules having a core of anammox bacteria and an outer rim of ammonia oxidizing bacteria; (b) subjecting the wastewater to ammonium oxidation at a temperature between 5 to 25° C., a dissolved oxygen concentration between 0.4 mg/L to 4.0 mg/L, and a hydraulic retention time between 0.5 hours to 1.5 days, obtaining a nitrogen gaseous stream and a dispersion of granular and non-sludge in treated wastewater; and (c) separating the dispersion into a granular sludge stream and a stream of treated wastewater and non-granular sludge, and (d) recycling the granular sludge to the reactor while discharging the non-granular sludge, wherein the granular sludge has a reactor retention time at least ten times the hydraulic retention time, and wherein the retention time of non-granular sludge is no more than three times the hydraulic retention time.

14 Claims, No Drawings

PROCESS FOR BIOLOGICAL REMOVAL OF NITROGEN FROM WASTEWATER

CROSS-REFERENCE TO RELATED APPLICATIONS

This application is the National Phase of International Patent Application No. PCT/NL2014/050204, filed Apr. 3, 2014, published on Oct. 23, 2014 as WO 2014/171819 A1, which claims priority to European Patent Application No. 13163989.0, filed Apr. 16, 2013. The contents of which are herein incorporated by reference in its entirety.

FIELD OF THE INVENTION

The invention relates to a process for biological removal of nitrogen from wastewater in a reactor containing granular sludge comprising granules having a core of anammox bacteria and an outer rim of ammonia oxidizing bacteria at temperatures below 25° C.

BACKGROUND OF THE INVENTION

A process for combined nitrification and anaerobic ammonium oxidation (anammox) of wastewater is known in the art and typically used for treatment of ammonium-rich wastewater streams at mesophilic temperatures, i.e. in the range of from 25 to 40° C. In this process, half of the ammonium is first oxidized by ammonia oxidizing bacteria to form nitrite according to the following reaction equation:

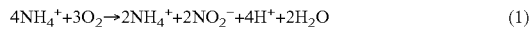

$$4NH_4^+ + 3O_2 \rightarrow 2NH_4^+ + 2NO_2^- + 4H^+ + 2H_2O \quad (1)$$

The resulting ammonium and nitrite are then converted to dinitrogen gas by anammox bacteria according to the following reaction equation:

$$NH_4^+ + NO_2^- \rightarrow N_2 + 2H_2O \quad (2)$$

It is known to carry out both process steps in a single reactor wherein the ammonia oxidizing bacteria and the anammox bacteria form compact sludge granules having a core of anammox bacteria and an outer rim of ammonia oxidizing bacteria. Such process is for example described in J. R. Vázquez-Padin et al., *Water Science & Technology* (2011), p. 1282-1288.

Anammox bacteria have a slow grow rate and therefore, the combined nitrification and anaerobic ammonium oxidation of wastewater is mainly applied for wastewater streams having a temperature around 30° C. Moreover, at mesophilic temperatures, the maximum growth rate of ammonia oxidizing bacteria is larger than the maximum growth rate of nitrite oxidizing bacteria, thus avoiding the undesired oxidation of nitrite to nitrate.

It would, however, be advantageous if the combined nitrification and anaerobic ammonium oxidation of wastewater could be carried out at lower temperature, i.e. below 25° C., preferably between 10 and 20° C., since domestic wastewater is typically available at such lower temperatures. Combined nitrification and anaerobic ammonium oxidation of wastewater at low temperatures has been proposed. In J. R. Vázquez-Padin et al., *Water Science & Technology* (2011), p. 1282-1288, suitable conditions for combined nitrification and anaerobic ammonium oxidation of diluted wastewater streams at low temperatures in a two-units configuration and in a single-unit configuration has been studied. It was found that it is possible to carry out combined nitrification and anaerobic ammonium oxidation in a single reactor at 20° C. The reactor has a height/diameter ratio of 5.5. Under the process conditions applied compact sludge granules having a core of anammox bacteria and an outer rim of ammonia oxidizing bacteria are formed. The process disclosed in Vázquez-Padin et al. is operated in batch mode.

In WO2011/110905 is disclosed a process for biological purification of ammonium-containing wastewater in an aeration tank at a low oxygen concentration (less than 1.0 mg/L dissolved oxygen) at temperatures between 7 and 25° C., wherein surplus sludge formed in the deammonification of sludge water from a digester at a temperature above 25° C. is fed to the aeration tank to continuously augment the amount of anammox bacteria in the aeration tank. In the process of WO2011/110905, part of the sludge is recycled over the aeration tank without removal of non-granular sludge.

There is a need in the art for an improved process for combined nitrification and anaerobic ammonium oxidation at low temperatures that can be carried out at an industrial scale and for non-diluted wastewater streams and wherein no continuous augmentation with anammox bacteria is needed.

SUMMARY OF THE INVENTION

It has now been found that by operating a combined nitrification and anaerobic ammonium oxidation process in a single reactor comprising granular sludge with anammox and ammonia oxidizing bacteria at such conditions that the retention time of the granular sludge is at least ten times the hydraulic retention time and wherein the retention time of any non-granular sludge formed in the reactor is at most three times the hydraulic retention time and wherein the hydraulic retention time is in the range of from 0.5 hours to 1.5 days, the process can be operated at temperatures below 25° C., even in a reactor with a relatively low height to diameter ratio and even without augmentation with anammox bacteria. The conditions wherein the retention time of the granular sludge is substantially higher than the hydraulic retention time and wherein the retention time of non-granular sludge is not much higher than or similar to the hydraulic retention time are obtained by separating liquid reactor effluent into a fraction comprising the granular sludge and no or very small amounts of non-granular sludge, and a fraction comprising non-granular sludge. Such separation can for example be obtained by using an inclined plate settler and operating the settler at a relatively high upward velocity of the reactor effluent. The separated granular sludge is recycled to the reactor and the non-granular sludge is withdrawn from the process.

Accordingly, the invention provides a process for biological removal of nitrogen from wastewater comprising:

(a) providing a stream of wastewater comprising ammonium;

(b) continuously supplying the stream of wastewater to a reactor containing granular sludge comprising granules having a core of anammox bacteria and an outer rim of ammonia oxidizing bacteria;

(c) subjecting the wastewater in the reactor to ammonium oxidation under ammonium oxidizing conditions comprising a temperature in the range of from 5 to 25° C., a concentration of dissolved oxygen in the wastewater in the range of from 0.4 mg/L to 4.0 mg/L, and a hydraulic retention time of the wastewater in the reactor in the range of from 0.5 hours to 1.5 days, to obtain a gaseous stream comprising nitrogen and a dispersion of granular sludge and non-granular sludge in treated wastewater; and (d) continuously separating the dispersion obtained into a stream comprising granular sludge and a stream comprising treated wastewater and non-granular sludge and recycling the stream comprising granular sludge to the reactor and discharging the non-granular sludge from the process, wherein the granular sludge has a retention time in the reactor of at least ten times the hydraulic retention time, and wherein the retention time of any non-granular sludge in the reactor is equal to or at most three times the hydraulic retention time.

It is an advantage of the process according to the invention that nitrite oxidizing bacteria and heterotrophic oxidizing bacteria are selectively removed from the reactor whereas the retention time of granular sludge with anammox and ammonia oxidizing bacteria is increased. As a result, undesired nitrite oxidation to nitrate is minimized. Moreover, the selective removal of nitrite oxidizing bacteria and heterotrophic oxidizing bacteria allows the process to be operated at a relatively high dissolved oxygen concentration, which is advantageous for the conversion rate in the nitrification step. A further advantage of the process is that any influent solids are typically also separated from the liquid reactor effluent with the non-granular sludge.

Preferably, the process according to the invention is operated under conditions of high shear in the reactor of step (c). Such high shear has the advantage that the growth of non-granular, i.e. flocculent, biomass on the sludge granules is prevented or minimized and therewith favours the separation between granular and non-granular sludge in step (d). Alternatively, liquid effluent from the ammonium oxidation reactor in step (c) may be subjected to shear outside the reactor for example between steps (c) and (d) or during separation step (d).

DETAILED DESCRIPTION OF THE INVENTION

In the process according to the invention a stream of wastewater comprising ammonium is provided in step (a). The stream of wastewater provided preferably has a nitrogen content below 100 mg/L, more preferably in the range of from 25 to 75 mg/L. The stream of wastewater contains organic material, expressed as Biological Oxygen Demand (BOD). BOD is herein defined as the amount of dissolved oxygen (in mg) needed per liter of wastewater by aerobic microorganisms to break down organic material present in the wastewater at 20° C. over 5 days of incubation. Preferably, the stream of wastewater provided has a BOD of at most 100 mg/L, more preferably at most 70 mg/L, even more preferably at most 50 mg/L. Preferably, the stream of wastewater provided has a BOD and nitrogen content such that the quotient of BOD and nitrogen content is below 2.0, preferably below 1.5, more preferably in the range of from 0.5 to 1.0.

In step (b), the stream of wastewater is continuously supplied to a reactor containing granular sludge comprising granules having a core of anammox bacteria and an outer rim of ammonia oxidizing bacteria.

In step (c), the wastewater is then subjected in the reactor to ammonium oxidation under ammonium oxidizing conditions. The ammonium oxidizing conditions comprise a temperature in the range of from 5 to 25° C., a concentration of dissolved oxygen in the wastewater in the range of from 0.4 mg/L to 4.0 mg/L and a hydraulic retention time in the range of from 0.5 hours and 1.5 days. Under these conditions, part of the ammonium will be oxidized by ammonia oxidizing bacteria to nitrite according to equation (1) and the nitrite formed will react with ammonium to form dinitrogen. Under these conditions typically also some nitrite oxidizing bacteria will grow that oxidize part of the nitrite into nitrate and heterotrophic oxidizing bacteria will oxidize BOD into carbon dioxide. In this ammonium oxidizing step, a gas stream comprising nitrogen, carbon dioxide and oxygen and a dispersion of granular sludge and non-granular sludge in treated wastewater are obtained. The granular sludge comprises the granules having a core of anammox bacteria and an outer rim of ammonia oxidizing bacteria, whereas the nitrite oxidizing bacteria and the heterotrophic oxidizing bacteria will typically be present as non-granular, i.e. flocculent, sludge. The gaseous stream usually separates from the liquid phase in the reactor, optionally by means of a gas/liquid separator incorporated in or just downstream of the reactor. The gaseous stream is withdrawn from the reactor.

In a further step (d), the dispersion of granular sludge and non-granular sludge in treated wastewater obtained in step (c) is continuously separated into a stream comprising granular sludge and a stream comprising treated wastewater and non-granular sludge. The stream comprising granular sludge thus obtained preferably comprises no or only a small amount of non-granular sludge, more preferably comprises at most 5 wt % non-granular sludge based on total weight of sludge in that stream, even more preferably at most 1 wt % non-granular sludge, still more preferably at most 0.5 wt %. The stream comprising granular sludge is recycled to the reactor in order to maintain a relatively large retention time of the granular sludge. Preferably, the entire stream comprising granular sludge is recycled to the reactor.

The stream comprising treated wastewater and non-granular sludge preferably comprises no or only small amounts of granular sludge. More preferably, this stream comprises less than 5 vol % of granular sludge based on the total volume of the stream, more preferably less than 1 vol %, even more preferably less than 0.5 vol %.

Non-granular sludge is withdrawn from the process, optionally after having been separated from the stream comprising treated wastewater and non-granular sludge. In case of such separation, treated wastewater that is essentially free of non-granular sludge may be partly recycled to step (c) or to a pre-treatment step, for example a pre-sedimentation step, for pre-treating the wastewater to be provided in step (a).

In the process according to the invention, the separation and recycling in step (d) is operated such that the granular sludge has a retention time in the reactor of at least ten times the hydraulic retention time and the retention time of any non-granular sludge in the reactor is equal to or at most three times the hydraulic retention time. Preferably, the retention time of the granular sludge is at least 30 times the hydraulic retention time, more preferably at least 50 times, even more preferably at least 100 times. The retention time of the granular sludge may be as high as 200 times, or even 500 times or more the hydraulic retention time. Preferably, the retention time of the granular sludge is in the range of from 10 to 100 days, more preferably of from 20 to 80 days, even more preferably of from 40 to 60 days.

The retention time of any non-granular sludge in the reactor is preferably in the range of from 1 to 2 times the hydraulic retention time, more preferably in the range of from 1.0 to 1.5 times. Most preferably the retention time of the non-granular sludge is as close to the hydraulic retention time as practicable.

In order to avoid extensive growth of nitrite oxidizing and heterotrophic oxidizing bacteria in the reactor, the hydraulic retention time is not larger than 1.5 days, preferably not larger than 1 day, more preferably not larger than 12 hours. In order to achieve sufficient nitrogen removal, the hydraulic retention time is at least 0.5 hours, preferably at least 1 hour, more preferably at least 2 hours. Preferably, the hydraulic retention time is in the range of from 1 hour to 1 day, more preferably of from 2 hours to 12 hours.

Reference herein to the hydraulic retention time is to the residence time of the wastewater in the reactor.

The desired retention times for granular and non-granular sludge are achieved by effectuating a sharp separation between granular sludge and non-granular sludge in step (d) such that most of the granular sludge, preferably at least 90%, more preferably at least 95%, even more preferably at least 99% can be recycled to the reactor, whilst most of the non-granular sludge, preferably at least 90%, more preferably at least 95%, even more preferably at least 99 wt % is withdrawn from the process.

In order to effectuate such sharp separation any suitable liquid/solid separator may be used. Preferably, the separation in step (d) is carried out using an inclined plate settler. An inclined plate settler comprises a multitude of parallel inclined plates between which a liquid is flowed upwardly. The solids in the liquid are allowed to settle on the inclined, parallel plates and slide into a container, e.g. a hopper, placed at the bottom of the settler. It has been found that if step (d) is carried out in an inclined plate settler at a relatively large upward flow of the liquid, a sharp separation between granular sludge and non-granular sludge is achieved. Preferably therefore, step (d) comprises separating the dispersion in an inclined plate settler comprising a multitude of parallel inclined plates, wherein the dispersion is flowed between the inclined plates at an upward velocity in the range of from 3 to 15 m/h, more preferably of from 4 to 12 m/h, even more preferably of from 5 to 9 m/h.

It has been found that the separation between granular and non-granular sludge and therewith the desired retention times for granular and non-granular sludge can be further improved by applying shear to the sludge granules. Such shear may be applied in the reactor, i.e. during step (c), during separation step (d), or between steps (c) and (d), i.e. on liquid effluent of the reactor prior to separation step (d). Preferably, shear is applied to the sludge granules at a shear rate in the range of from 50 to 500 $s^{-1}$, more preferably of from 80 to 300 $s^{-1}$, even more preferably of from 100 to 200 $s^{-1}$.

Shear may be applied to the granules in the reactor during step (c), for example by flowing gas through the wastewater in the reactor, preferably in upflow direction. Preferably, the shear is applied to the sludge granules by flowing gas through the wastewater in the reactor at a superficial gas velocity in the range of from 3 to 20 m/h, more preferably of from 5 to 15 m/h, even more preferably of from 8 to 12 m/h. The gas flowed through the wastewater may be any suitable gas stream such as for example air. It will be appreciated that the amount of air to be supplied to the reactor is restricted by the requirement on dissolved oxygen concentration. In order to achieve the desired shear by flowing gas through the wastewater in the reactor without exceeding the desired dissolved oxygen concentration, part of the gas stream obtained in step (c) may be recycled to the reactor to form at least part of the gas flowed through the wastewater.

Alternatively, shear may be applied to the granules during separation step (d) or, more preferably, between steps (c) and (d). Shear may for example be applied between steps (c) and (d) by flowing gas through the liquid reactor effluent, i.e. the dispersion of granular sludge and non-granular sludge in treated wastewater, prior to supplying the dispersion to a separator in step (d). If shear is applied after step (c), this may suitably be done by flowing air through the dispersion, since the amount of dissolved oxygen is not critical in this stage of the process.

An advantage of the process according to the invention is that the concentration of nitrite oxidizing and heterotrophic oxidizing bacteria in the reactor is kept low. Therefore, the concentration of dissolved oxygen in the wastewater in step (c) may be higher than in a process with a higher concentration of nitrite and heterotrophic oxidizing bacteria, such as for example WO2011/110905. The concentration of dissolved oxygen in step (c) is in the range of from 0.4 to 4.0 mg/L, preferably of from 0.5 to 3.5 mg/L, more preferably of from 1.0 to 3.0, even more preferably of from 1.2 to 2.5 mg/L.

The reactor may have any suitable dimensions, preferably the reactor has a height to diameter ratio below 5, more preferably below 3, even more preferably below 1. A relatively low height to diameter ratio saves on building costs for the reactor and less pressure is needed for any air supplied to the reactor.

The stream of wastewater comprising ammonium may be any wastewater stream from which ammonium is to be removed, for example domestic or industrial wastewater. In case nitrogen is to be removed from a wastewater stream with a relatively high BOD/N, for example above 2.0 or above 1.0, the process preferably further comprises a pre-treatment step for removing BOD from such stream, for example by means of a pre-sedimentation step, in order to provide the wastewater comprising ammonium and having a lower BOD/N.

Pre-sedimentation for BOD removal is well-known in the art and typically comprises passing the wastewater through one or more basins or clarifiers wherein solid particles settle to the bottom of the basin. Any suitable pre-sedimentation process known in the art may be used. The solid precipitate comprises a relative large part of the BOD of the wastewater that was subjected to pre-sedimentation. In the process according to the invention, the solid precipitate, typically referred to as primary sludge, is preferably subjected to anaerobic digestion to obtain biogas. A further advantage of having a BOD removal step as pretreatment, is that solid compounds in the wastewater stream that have a density that is higher than or comparable to the density of the granular sludge will also be removed prior to supplying the stream of wastewater to the ammonium oxidation reactor.

The invention claimed is:
1. A process for biological removal of nitrogen from wastewater comprising:
 (a) continuously supplying a stream of wastewater comprising ammonium to a reactor containing granular sludge comprising granules having a core of anammox bacteria and an outer rim of ammonia oxidizing bacteria;
 (b) subjecting the wastewater to ammonium oxidation under ammonium oxidizing conditions comprising a temperature in the range of from 5 to 25° C., a concentration of dissolved oxygen in the wastewater in the range of from 0.4 mg/L to 4.0 mg/L, and a hydraulic retention time of the wastewater in the reactor in the range of from 0.5 hours to 1.5 days, to obtain a gaseous stream comprising nitrogen and a dispersion of granular sludge and non-granular sludge in treated wastewater; and (c) continuously separating the dispersion into a stream comprising granular sludge and a stream comprising treated wastewater and non-granular sludge and recycling the stream comprising granular sludge to the reactor and discharging the non-granular sludge from the process, wherein the granular sludge has a retention time in the reactor of at least ten times the hydraulic retention time, and wherein the retention time of non-granular sludge in the reactor is equal to or at most three times the hydraulic retention time.

2. The process according to claim 1, wherein the retention time of any non-granular sludge is in the range of from 1 to 2 times the hydraulic retention time.

3. The process according to claim 1, wherein step (c) comprises separating the dispersion in an inclined plate settler comprising a multitude of parallel inclined plates, wherein the dispersion is flowed between the inclined plates at an upward velocity in the range of from 3 to 15 m/h.

4. The process according to claim 3, wherein the dispersion is flowed between the inclined plates at an upward velocity in the range of from 4 to 12 m/h.

5. The process according to claim 1, wherein during step (b) or between steps (b) and (c) or during step (c), shear is applied to the sludge granules.

6. The process according to claim 5, wherein shear is applied at a shear rate in the range of from 50 to 500 s−1.

7. The process according to claim 5, wherein the shear is applied to the sludge granules by flowing gas through the wastewater in the reactor at a superficial gas velocity in the range of from 3 to 20 m/h.

8. The process according to claim 7, wherein gas is flowed through the wastewater in the reactor at a superficial gas velocity in the range of from 5 to 15 m/h.

9. The process according to claim 7, wherein the gas stream obtained in step (b) is recycled to the reactor to form at least part of the gas flowed through the wastewater.

10. The process according to claim 1, wherein the hydraulic retention time is in the range of from 1 hour to 1 day.

11. The process according to claim 1, wherein the concentration of dissolved oxygen in step (b) is in the range of from 1.0 to 3.0 mg/L.

12. The process according to claim 1, wherein the reactor has a height to diameter ratio below 5.

13. The process according to claim 1, wherein the stream of wastewater comprising ammonium is provided by removing BOD from an industrial or domestic wastewater stream.

14. The process according to claim 13, wherein BOD removed from the industrial or domestic wastewater is subjected to anaerobic digestion to obtain biogas.

* * * * *